June 30, 1942. H. RUMP 2,288,372
INSERT IN ROTARY FURNACES
Filed July 1, 1939 2 Sheets-Sheet 1
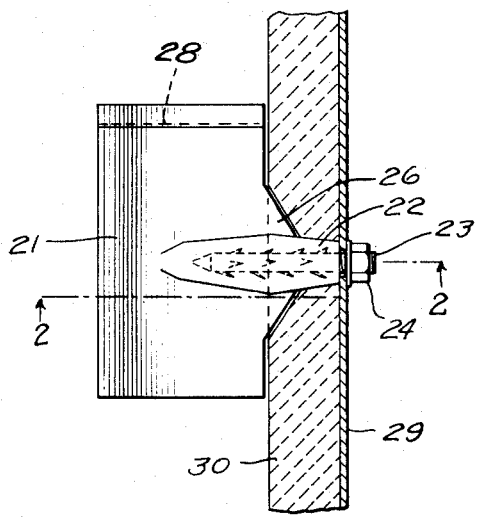
Fig. 1.
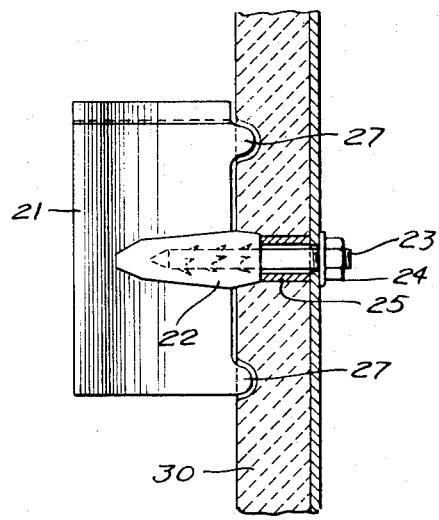
Fig. 3.
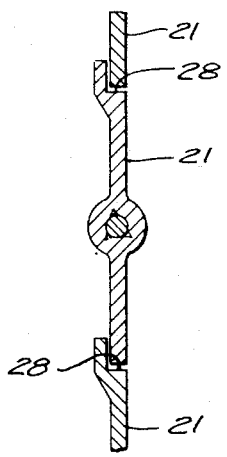
Fig. 2.
Fig. 4.
INVENTOR
HEINRICH RUMP
BY
ATTORNEYS June 30, 1942.                H. RUMP                2,288,372
                      INSERT IN ROTARY FURNACES
                Filed July 1, 1939           2 Sheets-Sheet 2
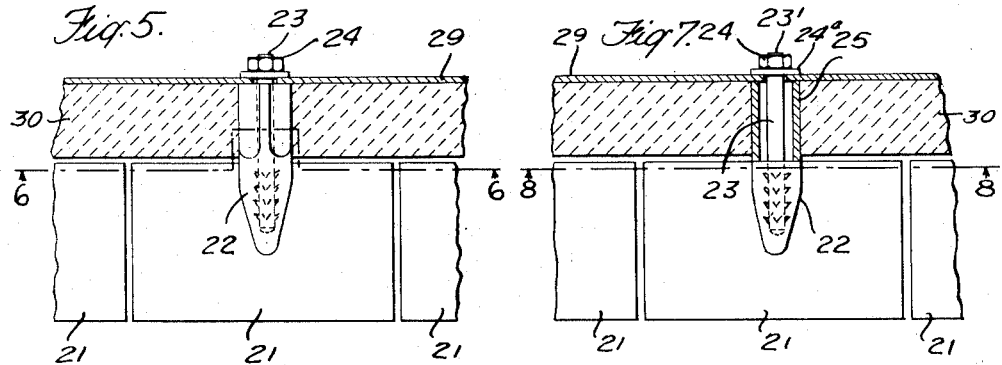
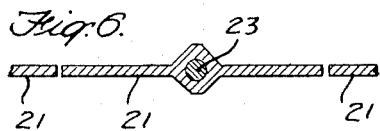
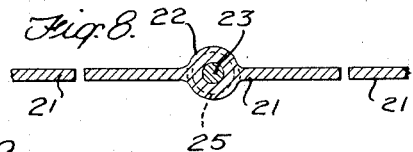
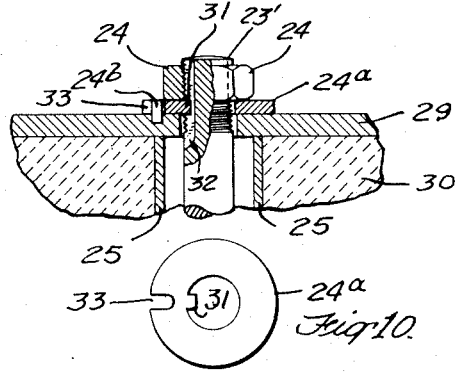
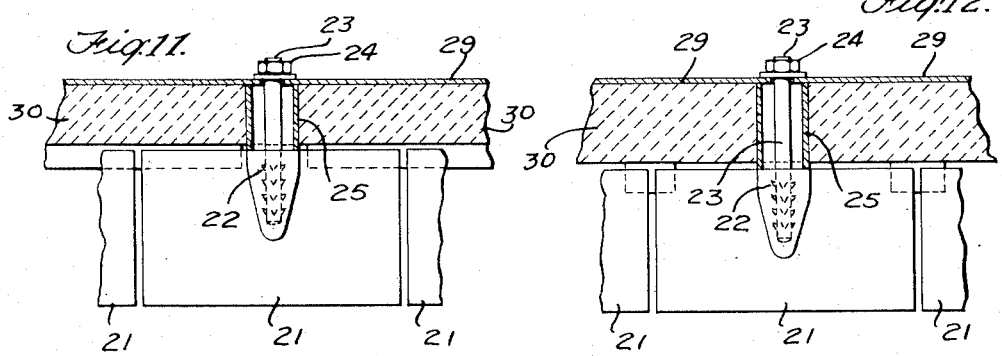
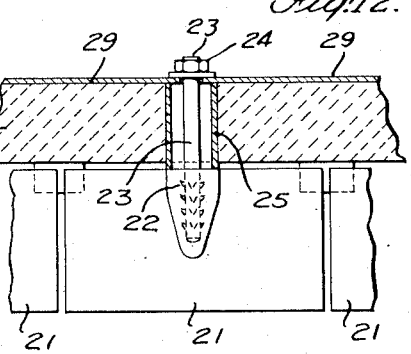
INVENTOR
HEINRICH RUMP
BY
ATTORNEYS Patented June 30, 1942

2,288,372

UNITED STATES PATENT OFFICE 2,288,372

INSERT IN ROTARY FURNACES

Heinrich Rump, Leverkusen-Wiesdorf, Germany

Application July 1, 1939, Serial No. 282,542
In Germany March 24, 1938

8 Claims. (Cl. 263—32)

The present invention relates to superficially extensive inserts exposed to high temperatures inside a rotary furnace.

It is known to provide stirring scoops in rotary furnaces in order to bring the materials in the furnace into better contact with the hot gases. These stirrers, exposed to the strong action of the fire, are either so formed that individual firebricks or series of firebricks are caused to project into the interior of the furnace or they are made from particularly heat resistant metal alloys. In the latter case each stirrer is provided with an angular flange with which it is fastened by two or more screws or rivets to the furnace wall, or they are welded over the whole length. If the angular flange is so arranged that it lies with its surface against the lining the fastening screws passing through the wall must be made of heat resistant material since the screw heads are exposed to the fire. Such heat resistant materials are brittle. The stirrers have a tendency to bending particularly by reason of the different expansion of the stirrers and of the wall to which they are rigidly secured. Stirrers are also known of metal in which the fixing flange is directly screwed, riveted or sweated to the rotary furnace casing so that the fixture is protected by the lining. Such stirrers have however the disadvantage that the broad fastening flange lies on the cold furnace casing while the same structure at the other end inside the oven is exposed to the hot gases, so that dangerous heat stresses result in the stirrer which may lead to destruction of the stirrer. Furthermore this kind of fixture has the disadvantage that the stirrers can only be changed after removal of the lining.

These disadvantages are overcome in accordance with the invention in that superficially extensive inserts are only connected by a single, preferably centrally arranged fastening with the furnace casing so that the stirrers can expand freely in all directions.

It is important for this single point fastening that the fastening bolts are so fixed to the casing of the rotary furnace, preferably by screwing, that the fastening itself is not disturbed by temperature differences between the rotary oven casing, the lining and the stirrer (when the invention is applied to the mounting of stirrers), and any different thermal expansions remain without influence thereon. The stirrer blade is therefore preferably provided with a shaft which extends through the lining to the casing of the rotary furnace and in which fastening bolts are embedded e. g. by casting or cementing in place. Naturally it is also possible to embed the bolts only in a hub-like thickening of the stirrer blade, or to secure them with hammer head screws therein, and to replace the shaft by a tubular housing extending to the rotary furnace lining as a distance piece, or instead to provide on the bolt in front of the rotary oven casing a collar or abutment so that the stirrer can be drawn tight against this tubular intermediate member of the collar or abutment in the bolt.

Rotation of the stirrer about the fixing point can be prevented in various ways. By way of example may be mentioned polygonal or non-circular formation of the stirrer shaft or fastening bolt guided in the lining or the casing of the rotary furnace. Rotation may also be prevented, by retaining washers like those used for locknuts. Another advantageous method is by causing the blade of the stirrer to project somewhat into the lining or to provide on the blade projecting ribs or lobes which engage in corresponding grooves or projections of the furnace lining or casing, preferably the former.

In the kind of construction of the stirring scoop described, subsequent insertion into finished lined rotary furnaces is also possible because only an individual bolt or stirrer shaft is to project through the lining.

It has been found particularly advantageous so to arrange the stirrers in relation to the lining that the stirrer shaft lies in the intersection point of a longitudinal and a cross groove, so that for the manufacture of the apertures for the shaft merely one edge of four contracting bricks need be broken without weakening the individual bricks while the longitudinal grooves at the same time may be used for guiding the above mentioned lobes or ribs.

If the stirrers are intended to pass as continuous stirring surfaces through the whole rotary furnace in the longitudinal direction it is to be recommended that these be divided into individual stirrers each of which is provided with a one point mounting. The individual stirrers preferably have abutments in which the adjacent stirring scoop is inserted with play in order to make possible thermal expansion of the individual scoops.

In a similar way baffle rings may be divided and fixed in the rotary furnace, and this fixing may be used in general for all similar superficially extensive inserts exposed to high temperatures.

In the accompanying drawings some embodiments of the subject of the invention are shown by way of example.

Fig. 1 shows in elevation an insert provided with a shaft abutting the shell of a furnace, the insert being secured against rotation by ribs projecting into the lining.

Fig. 2 is a side-sectional view of the insert shown in Fig. 1.

Fig. 3 shows in elevation an insert provided with a short shaft spaced from the shell of the furnace by a tubular spacer, the insert being secured against rotation by lobes projecting into the heat-resisting lining.

Fig. 4 is a cross-sectional view of several inserts in interlocking position.

Fig. 5 shows in elevation an insert provided with a square shaft.

Fig. 6 is a cross-sectional view of the modification shown in Fig. 5 at section-line 6—6.

Fig. 7 shows in elevation an insert provided with a short shaft spaced from the shell of the furnace wherein the insert is secured against rotation by a lock-washer.

Fig. 8 is a cross-sectional view of the modification shown in Fig. 7 at section-line 8—8.

Fig. 9 is a detailed cross-sectional view showing the operation of the lock-washer shown in Fig. 7.

Fig. 10 is a plan-view of the lock-washer shown in Fig. 9.

Fig. 11 shows in elevation an insert provided with a shaft spaced from the shell of the furnace by a tubular spacer, the insert being secured against rotation by the projection of its inner edge into a seam of the heat-resisting lining.

Fig. 12 shows in elevation an insert similar to that shown in Fig. 11 secured against rotation by projections of the heat-resisting lining.

In these figures of drawings, 21 designates the blade of the insert, 22 the shaft of the insert, 23 the threaded bolt embedded in the shaft and which is drawn tight by a nut 24. When the shaft is not made sufficiently long to project all the way through the heat-resisting lining 30 to abut the furnace shell 29, it is spaced from the furnace shell by a tubular spacer 25. Numerals 26 and 27 designate modifications of ribs and lobes projecting from the blades of the insert into the furnace lining 30 to prevent rotation of the insert. When it is desired to interlock a group of inserts with one another, each insert 21 is provided at the end of its blade with a recess 28 into which the adjacent blade is inserted with play. In Figs. 7, 9 and 10, 24a designates a lock-washer provided on its inner periphery with a projection 31 adapted to engage longitudinal recess 22 in threaded bolt 23'. The washer is further provided at its outer periphery with a recess 33 to engage pin 24b projecting into the shell 29 of the furnace.

I claim:

1. A rotary furnace comprising a shell, a heat-resisting lining, a series of interlocking inserts within the furnace adjacent said lining, a single means projecting from each of the series of inserts thru said lining and abutting the shell and means housed by each of said first means for securing said inserts to said shell.

2. A series of superficially extensive inserts exposed to high temperature inside a rotary furnace, in which series each member is secured to the furnace shell by a single point fixing and interlocks with an adjacent member.

3. A series of superficially extensive inserts exposed to high temperature inside a rotary furnace, in which series each member is secured to the furnace shell by a single point fixing and interlocks with an adjacent member, said single point fixing being centrally located.

4. A series of superficially extensive inserts exposed to high temperature inside a rotary furnace, in which series each member is secured to the furnace shell by a single point fixing and interlocks with an adjacent member, said single point fixing being a screwed bolt embedded in the material of the insert.

5. A series of superficially extensive inserts exposed to high temperature inside a rotary furnace, in which series each member is secured to the furnace shell by a single point fixing and interlocks with an adjacent member, said single point fixing being a screwed bolt embedded in the material of the insert and being centrally located.

6. A series of superficially extensive inserts exposed to high temperature inside a rotary furnace, in which series each member is secured to the furnace shell by a single point fixing and interlocks with an adjacent member and being secured against rotation by at least one projecting rib, said rib being guided in a corresponding guide of the wall of the apparatus.

7. A series of superficially extensive inserts exposed to high temperature inside a rotary furnace, in which series each member is secured to the furnace shell by a single point fixing and interlocks with an adjacent member, said insert having a shaft extending to the furnace lining and being secured to the outer shell.

8. In a rotary furnace comprising a shell and a heat-resisting lining, an insert capable of withstanding high temperatures and provided with a single shaft and a projecting rib, single means embedded in said shaft to secure said insert to said shell, the insert being supported solely by said shell, and guiding means in said heat-resisting lining to cooperate with said rib to secure said insert against rotation.

HEINRICH RUMP.